United States Patent [19]

Imler

[11] 4,157,910

[45] Jun. 12, 1979

[54] APPARATUS FOR TEMPERING FLAT OR CURVED GLASS SHEETS

[75] Inventor: Vaughn R. Imler, Valencia, Pa.

[73] Assignee: PPG Industries, Inc., Pittsburgh, Pa.

[21] Appl. No.: 871,873

[22] Filed: Jan. 24, 1978

[51] Int. Cl.² ............................................ C03B 27/00
[52] U.S. Cl. ................................. 65/351; 65/114; 65/348
[58] Field of Search .............. 65/104, 114, 348, 349, 65/350, 351

[56] References Cited

U.S. PATENT DOCUMENTS

| | | | |
|---|---|---|---|
| 1,616,855 | 2/1927 | Hurst | 65/348 |
| 1,879,699 | 9/1932 | Long | 65/348 |
| 1,999,337 | 4/1935 | Meer | 65/348 |
| 2,199,511 | 5/1940 | Perry et al. | 65/114 |
| 2,213,405 | 9/1940 | Paddock | 65/349 |
| 2,265,308 | 12/1941 | Perry et al. | 65/348 |
| 2,271,377 | 1/1942 | Monnet | 65/114 |
| 2,724,215 | 11/1955 | Gilstrap | 65/348 |
| 2,790,270 | 4/1957 | Freiberg | 65/348 |
| 2,876,592 | 3/1959 | Black et al. | 65/351 |
| 2,876,593 | 3/1959 | Neuhausen | 65/349 |
| 3,024,572 | 3/1962 | Richardson | 65/348 |
| 3,125,430 | 3/1964 | Richardson | 65/114 |
| 3,214,256 | 10/1965 | Baker | 65/114 |
| 3,231,353 | 1/1966 | Julio | 65/114 |
| 3,279,906 | 10/1966 | Baker | 65/268 |
| 3,454,388 | 7/1969 | Ritter, Jr. | 65/348 |
| 3,476,541 | 11/1969 | Ritter, Jr. | 65/268 |
| 3,488,178 | 1/1970 | Welker et al. | 65/268 |
| 3,508,898 | 4/1970 | Akfirat | 65/114 |
| 3,598,562 | 8/1971 | Angely | 65/348 |
| 3,600,151 | 8/1971 | Cypher et al. | 65/348 |
| 3,717,449 | 2/1973 | Seymour | 65/104 |
| 3,776,708 | 12/1973 | Seymour | 65/114 |
| 3,881,906 | 5/1975 | Ritter et al. | 65/104 |
| 3,918,950 | 11/1975 | Stilley | 65/114 |

FOREIGN PATENT DOCUMENTS 626078 2/1936 Fed. Rep. of Germany ............. 65/348

Primary Examiner—Arthur D. Kellogg
Attorney, Agent, or Firm—Dennis G. Millman; Edward I. Mates

[57] ABSTRACT

Apparatus for tempering flat or curved glass sheets suspended in a vertical orientation comprising a plurality of nozzle boxes each pivotable about its longitudinal axis and adjustable in position to provide a pair of sets of nozzle boxes facing the opposite major surface of a glass sheet held in a quenching position between two sets of nozzle boxes. The present apparatus requires a minimum of power to cause relative movement of blasts of tempering fluid applied against the opposite major glass sheet surfaces, permits positional adjustment of individual nozzle boxes to define a flat or curved space corresponding to the shape of glass sheet handled, and simultaneously permits each nozzle box to oscillate about its longitudinal axis from a desired, adjusted orientation to optimize the heat exchange effect of the moving blasts of tempering fluid.

5 Claims, 5 Drawing Figures

APPARATUS FOR TEMPERING FLAT OR CURVED GLASS SHEETS

RELATION TO OTHER PATENT APPLICATIONS

This application is related to U.S. patent application Ser. No. 871,888, of Vaughn R. Imler for CONTROLLING BUFFETING DURING THE TEMPERING OF GLASS SHEETS and to U.S. patent application Ser. No. 871,876, of Vaughn R. Imler, for IMPROVING QUENCH EFFICIENCY, both of which applications are filed on the same date as this application.

BACKGROUND OF THE INVENTION

1. Field of the Invention

The present invention relates to improvements in tempering glass sheets. As is well known, a glass sheet is tempered by a two-step process in which the glass is first heated to an elevated temperature sufficiently high for tempering, and then it is cooled very rapidly to a temperature below the strain point.

Tempering provides glass sheets with a stress pattern in which the glass sheet develops a thin skin of compression stress surrounding an interior stressed in tension. Such a stress distribution makes the glass sheet much stronger than untempered glass so that tempered glass is less likely to shatter than untempered glass when struck by an object. Furthermore, in the less frequent times when an outside force is sufficiently large to cause tempered glass to fracture, tempered glass breaks up into a large number of smoothly surfaced, relatively small particles, which are far less dangerous than the larger pieces with jagged edges that result from the more easily induced fracture of untempered glass.

Typical prior tempering apparatus include nozzles extending from plenum chambers to direct a plurality of air blasts against the opposite major surfaces of a glass sheet. The prior art provides means to impart movement to the nozzles in unison relative to the glass sheet to avoid directing the air blasts against fixed locations on the glass. Fixed air blasts cool the fixed locations opposite the blasts rapidly while other locations adjacent the fixed locations are not cooled as rapidly. Without such relative movement, patterns of iridescence form on the surface of the tempered glass. These patterns of iridescence are very annoying when reviewed in reflection.

The glass tempering art has developed many techniques for imparting relative motion between the arrays of nozzles that face the opposite surfaces of a glass sheet to avoid iridescent patterns. Some of these involve linear reciprocation of the nozzles. Others involve linear movement of glass sheets past a pair of arrays of fixed opposing nozzles. Others involve applying orbital movement (elliptical or circular) of nozzles relative to a glass sheet supported at a fixed position.

The shape of the glass sheet to be tempered and its manner of support between plenum chambers determines the best technique for providing relative movement between the nozzle arrays extending from the plenum chambers and the glass sheet to be tempered. For example, when vertically supported glass sheets are oriented with a sharp bend extending in a given direction, it is known to reciprocate the nozzle arrays in spaced vertical planes along axes parallel or approximately parallel to the given direction. When a flat glass sheet or a gently curved sheet of shallow curvature is tempered, the prior art usually found it most convenient to impart air from nozzles to which are imparted circular orbital movements that overlap corresponding movement of the adjacent nozzles in spaced planes parallel to the position occupied by the glass sheet. Such simultaneous reciprocating or orbital motion of the nozzle has usually been accompanied by movement of the entire plenum chambers and apparatus which supports the nozzles and associated plenum chambers. Such devices have consumed tremendous amounts of energy because of the mass of apparatus elements moved in unison with the nozzles.

In an attempt to reduce energy consumption, apparatus has been developed incorporating two movable frames, one arranged on either side of a flat glass to be tempered. Each frame carries a set of nozzles intermediate the inner and outer ends of the nozzles by means of an elastic connection. Movement of the frames rather than the entire plenum chamber distorts the elastic connection and causes the nozzles to describe overlapping curved paths so that tempering fluid applied under pressure through the nozzles strikes the major surfaces of the glass sheet in moving paths to avoid iridescence. However, the elastic means providing the elastic connection impairs the durability of the tempering apparatus nozzles.

It is also known in the prior art to provide a series of nozzle boxes which are adjustable in orientation and capable of positional adjustment so as to provide a curved space between opposing sets of nozzle boxes that comprises nozzles extending approximately normal to the glass sheet surface and whose free ends define portions of spaced curved surfaces shaped to conform to the shape of the glass. However, prior to the present invention the adjustable nozzle arrangements have been such that the nozzle position and orientation, once fixed, cannot be changed to permit the blasts of tempering fluid to sweep relative to the glass sheets without providing either linear reciprocation or orbital movement of the entire nozzle boxes and their support construction in a flat plane depending upon the nature of the flatness or curvature of glass sheet undergoing processing. Such orbital movement or linear reciprocation of the nozzles in a flat plane caused the individual nozzle blasts to depend on the uniformity of glass sheet shape to limit the cyclical variations in nozzle to glass distance and orientation of the nozzle blasts relative to the glass surfaces, which were considered factors in promoting non-uniform tempering of shaped glass sheets.

Other prior art patents constrain the movement of arrays of nozzles to curved paths that maintain the nozzles in orientations that remain approximately normal to different portions of the curved surfaces of the glass sheet undergoing quenching as the nozzles move relative to the major glass sheet surfaces. Such apparatus moves the nozzle position controlling means as well as the nozzles and requires considerable energy to move the mass of equipment forming such means.

2. Description of the Prior Art

U.S. Pat. No. 2,271,377 to Monnet provides relative movement between fluid blasts ad flat glass surfaces by arranging nozzles in angled pairs and cycling the feed of blasts to each nozzle in each pair 180 degrees out of phase with one another. This apparatus requires continuous operation of valves in the fluid feed lines to which access is difficult.

U.S. Pat. No. 2,724,215 to Gilstrap discloses a conventional glass tempering apparatus provided with tubular air plenums that are reciprocated to sweep over the surface of flat glass sheets supported between sets of opposing nozzles for cooling during a tempering operation. The nozzles move in unison with their plenum chambers in flat, parallel planes.

U.S. Pat. No. 3,024,572 to Richardson and U.S. Pat. No. 3,717,449 to Seymour show individual elongated plenums that are fixed in position and that can be adjusted to provide a curved space corresponding to the curve of the glass between opposite sets of plenums. These patents also provide means to adjust the orientation of individual nozzle boxes so that the apertures in apertured walls can be directed normal to the corresponding portions of curved glass sheets relative to which they move during the cooling step of tempering. However, the entire system is moved in unison while quenching a shaped glass sheet.

U.S. Pat. Nos. 2,790,270 to Freiberg; 2,876,592 to Black and Moorhead and 2,876,593 to Neuhausen show tempering apparatus that control the movement of nozzles in curved paths and maintain the nozzle orientation substantially normal to each localized portion of the curved glass sheet during relative movement. Power is required to move the nozzles and the position control means for the nozzles, which are heavy.

U.S. Pat. No. 3,454,388 to Ritter reciprocates elongated nozzles having elongated slots about the longitudinal axes to play air blasts provided from rigidly supported apertured pipes over the opposite major glass sheet surfaces. No provision is made for making this apparatus suitable for tempering glass sheets other than those that are shaped to a flat configuration.

U.S. Pat. No. 3,476,541 to Ritter shows rotatable tubular members that cooperate with deflectors to play air blasts over glass surfaces to provide uniform cooling. The tubes are apertured, are polygonal in cross section with apertures in adjacent walls of the polygon offset from one another, and rotate about fixed axes of rotation in a single direction and are fixed in position about their axes of rotation.

U.S. Pat. No. 3,598,562 to Angely discloses apparatus for tempering flat glass sheets in which each nozzle of a set is connected to a plenum chamber and extends through an elastic pivotable connection to a plate so that movement of the plate intermediate the plenum chamber and the orifice of the nozzle causes the nozzles to move in unison in a path defined by the movement of the movable plate on each side of the glass sheet. No provision is made for adjusting the curvature defined by the nozzles to conform to a curved glass sheet.

SUMMARY OF THE INVENTION

The present invention provides apparatus for tempering flat or curved glass sheets supported vertically. The apparatus according to the present invention comprises a first set of nozzle boxes providing a first array of nozzles disposed to one side of a position to be occupied by a glass sheet during tempering, a second set of nozzle boxes providing a second array of nozzles disposed to the other side of said position and facing said first array of nozzles. Each of said nozzle boxes is provided with means for adjusting the orientation of the nozzles that extend in parallel relation to one another from a common wall of the nozzle box relative to the longitudinal axis of the associated nozzle box. Means is provided to adjust the position of each nozzle box relative to the nozzle box support structure so as to enable the nozzle arrays to assume a pair of spaced configurations that match the shape of a glass sheet undergoing quenching. Means constructed entirely of durable metal parts is provided to oscillate said nozzle boxes of each set in unison through a small angle in each angular direction about its longitudinal axis relative to said preselected orientation for each nozzle box to enable the blasts from said nozzles to sweep across the entire major surfaces of the glass sheet undergoing quenching in a manner that improves the uniformity of temper developed in the glass sheet and to provide a more efficient tempering operation than when the nozzles move in orbital paths in spaced flat planes or in curved paths while retaining a constant normal angle of impingement against a curved glass sheet surface during relative movement with respect to said curved major surfaces. The nozzle boxes preferably extend parallel to the axis of glass sheet bending.

It is thus seen that, instead of requiring movement of the entire tempering apparatus, a relatively small amount of the mass of the tempering apparatus is displaced to provide the angular oscillation for each of the nozzle boxes. The need for flexible couplings in the individual nozzle structures used to provide nozzle movement for quenching flat glass sheets in the prior art is avoided by the present invention.

The benefits of the present invention will be understood better in the light of a description of an illustrative embodiment which follows.

BRIEF DESCRIPTION OF THE DRAWINGS

In the drawings that form part of the description of the illustrative embodiment of the present invention, and where like reference numbers refer to like structural elements.

DESCRIPTION OF THE PREFERRED EMBODIMENT

Figure 1:
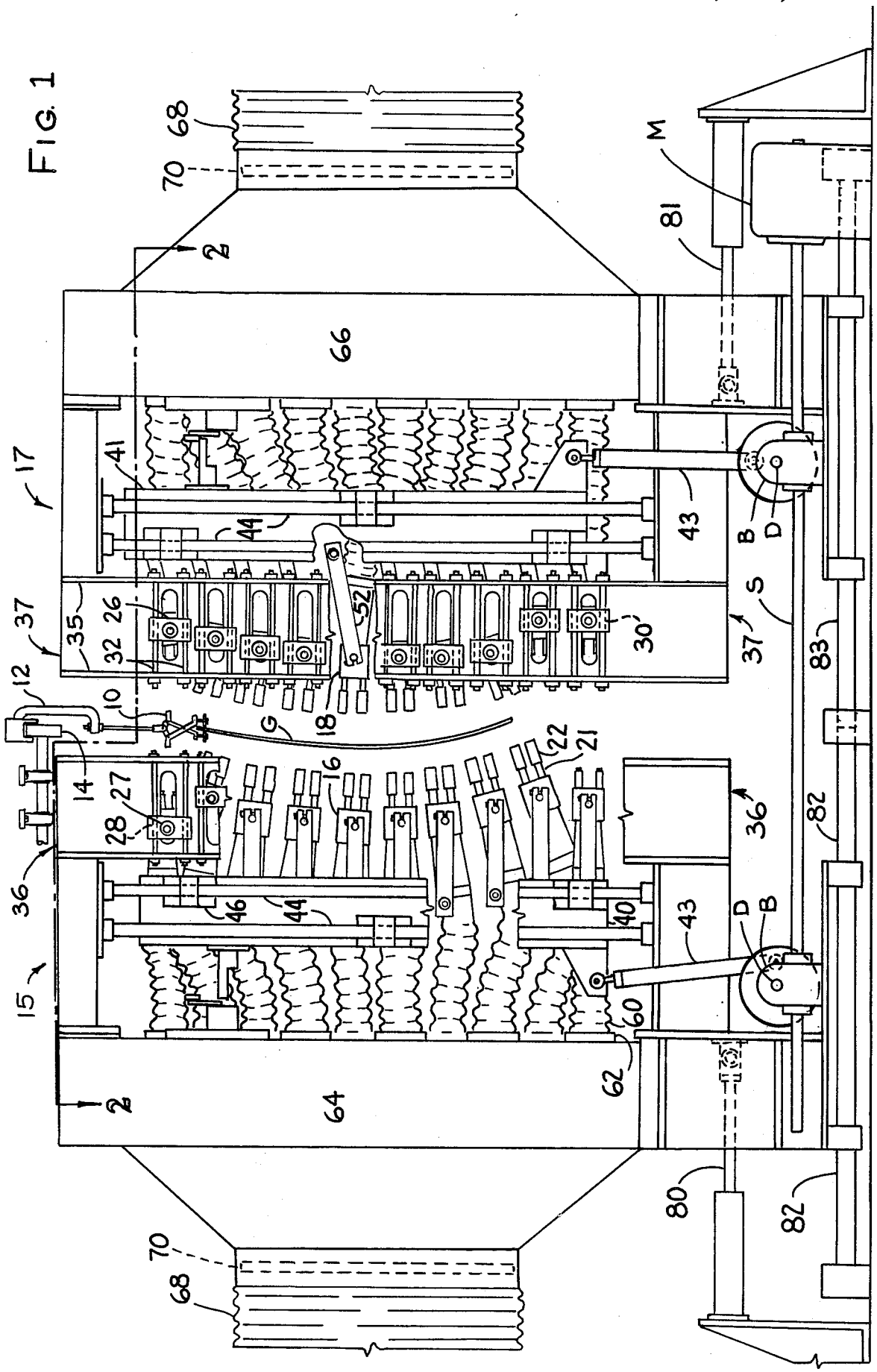
FIG. 1 is an end elevation of the embodiment of glass tempering apparatus comprising pivoted nozzle boxes according to the present invention with part of the structure broken away to show other structural elements that induce reciprocating pivotal movement of said pivoted nozzle boxes.
Figure 2:
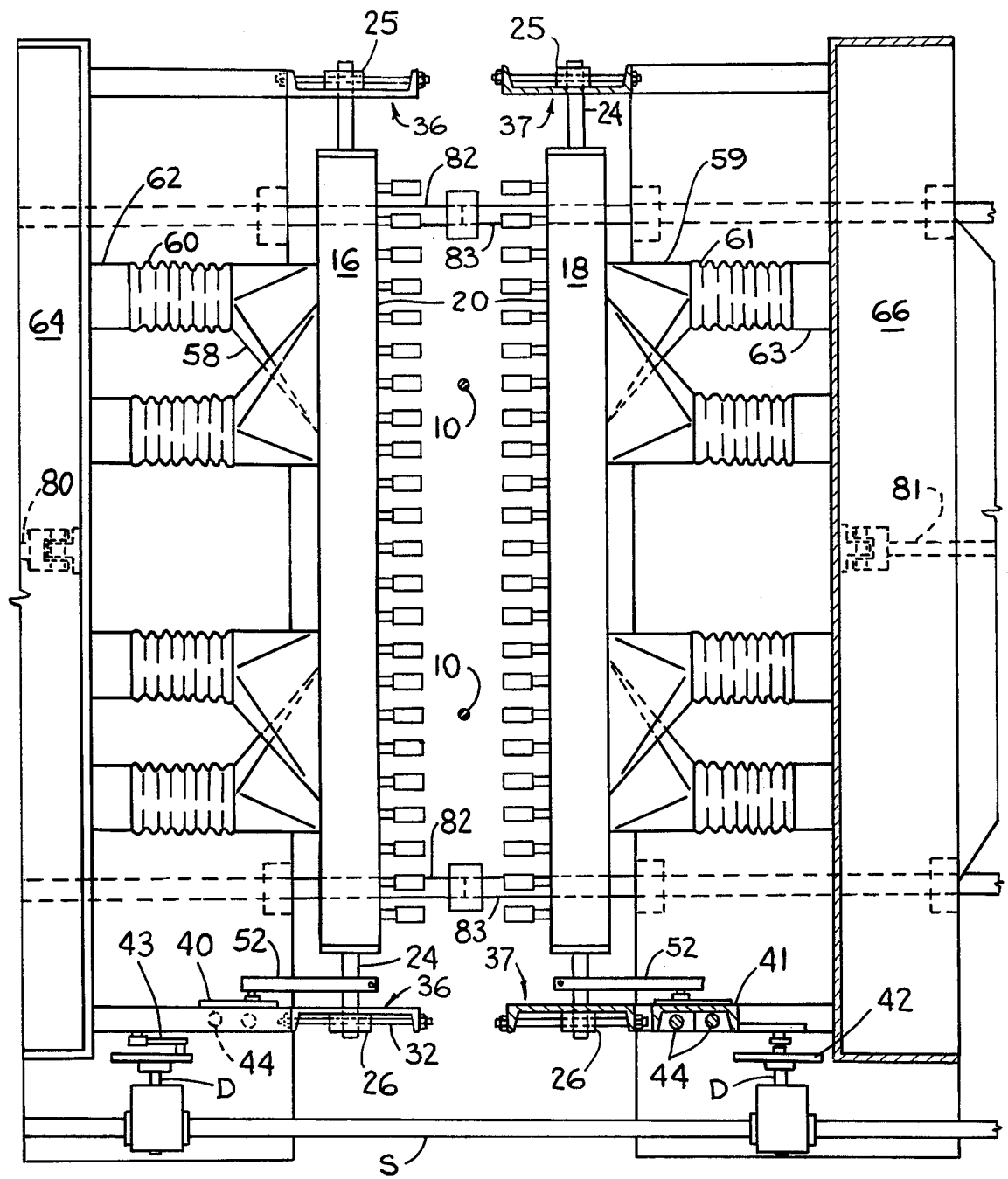
FIG. 2 is a cross-section view taken along the lines 2—2 of FIG. 1.

In order to facilitate the description of a specific embodiment of this invention, the terms "in", "inward", etc. refer to a horizontal transverse direction toward the position occupied by a glass sheet during quenching and the terms "out", "outward", etc. refer to a horizontal transverse direction away from the position occupied by a glass sheet during quenching. Both of these directions are through the thickness of the glass sheet. The term "longitudinal" means parallel to the direction of glass sheet movement into the tempering station and is horizontal in the illustrative embodiment of this invention, although the present invention is also useful when glass sheets are conveyed in a vertical direction to a tempering apparatus.

Referring to the drawings, a curved glass sheet G is shown suspended by tongs 10 carried by tong support carriage 12 movable into and out of a tempering station along an overhead roller conveyor 14 in a manner well known in the art. The apparatus comprises a first structural support 15 that supports a first set of nozzle boxes 16 located to one side of the position to be occupied by a glass sheet G and a second structural support 17 that supports a second set of nozzle boxes 18 located on the opposite side of the position occupied by glass sheet G. Each nozzle box 16 and 18 extends horizontally to be parallel to the axis of glass sheet curvature and is of thin sheet metal of polygonal cross-section and contains an apertured wall 20 facing the position occupied by the glass sheet G. Each of the apertures destined for use in a glass sheet quenching step has a metal nozzle 21 extending therefrom with a nozzle extension 22 of flexible material such as silicone rubber extending beyond the free end of the corresponding nozzle 21 to flex in case contact is made with a hot glass sheet G during quenching. The nozzles 21 are preferably fitted to the apertured wall 20 in the manner shown in U.S. Pat. No. 4,018,590 to Imler, the disclosure of which is incorporated herein by reference.

Figure 3:
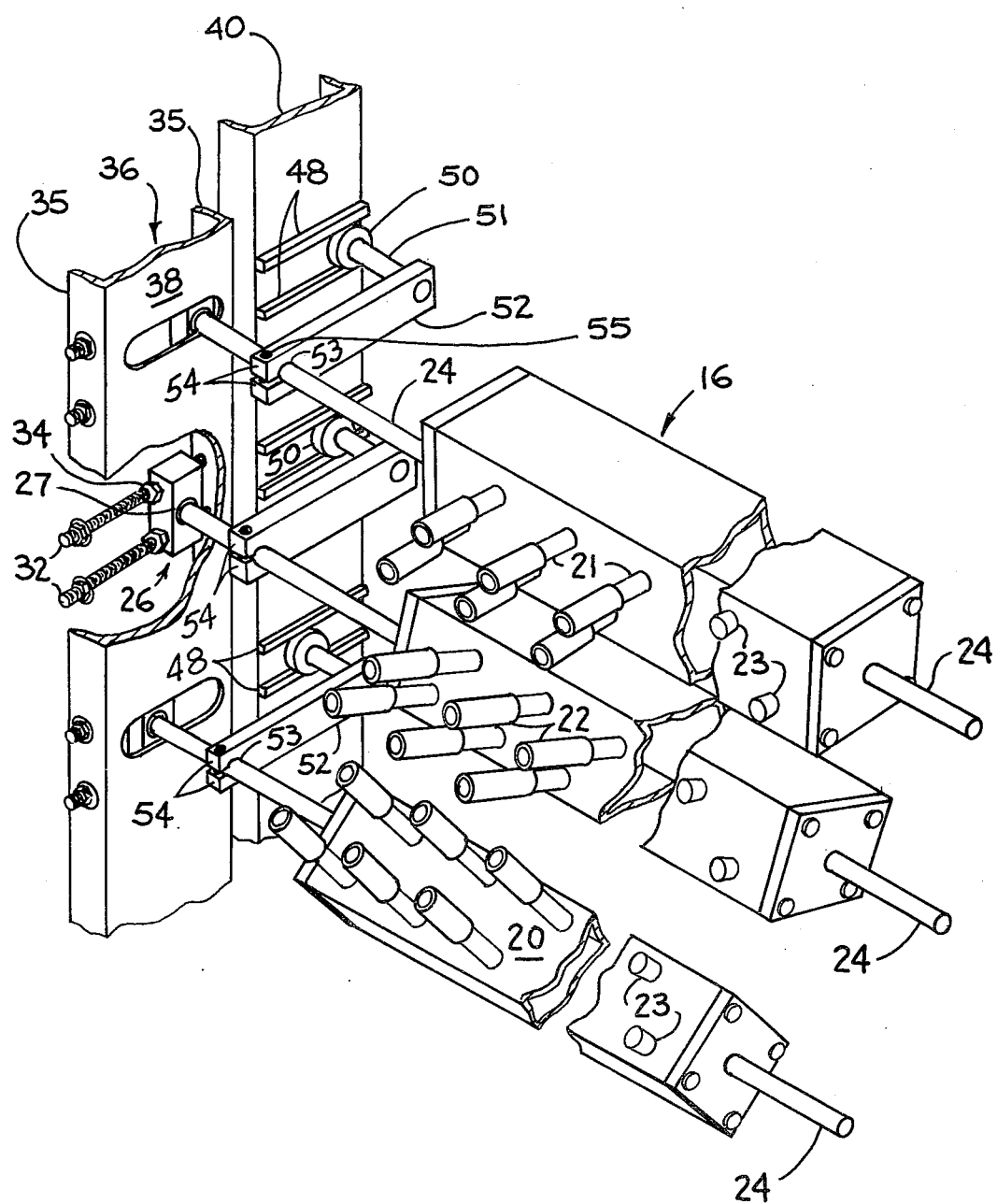
FIG. 3 is a fragmentary, isometric view of an end portion of the apparatus as in FIG. 1 showing the relation of several adjacent nozzle boxes to nozzle box support means and to linkage and cam means that control the rotating oscillation of the nozzle boxes and means to secure each nozzle box to define a mid-point position for rotation of each nozzle box.
Figure 4:
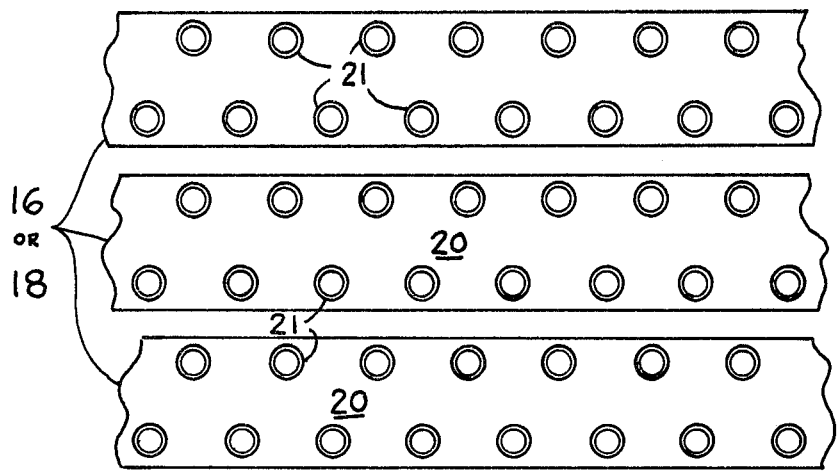
FIG. 4 is a fragmentary front view of a portion of one of the sets of nozzle boxes when the latter are oriented for tempering a flat glass sheet.

It should be understood that not all of the nozzle boxes nor all of the apertures of each nozzle box need be provided with nozzles. When the apparatus is used to temper glass sheets of a smaller size than the extent of all the nozzle boxes, it is suggested to plug the apertures in the apertured walls that do not come into alignment with the extent of the glass sheet being quenched. Selective plugging of apertures minimizes the total amount of power required for supplying air under pressure to temper the smaller glass sheets. FIG. 3 shows a plurality of plugs 23 closing unnecessary nozzles 21.

The nozzles 21 are arranged in two horizontally extending rows per nozzle box 16 or 18, with the nozzles or each row offset diagonally from the nozzles of the other row of nozzles associated with the same nozzle box and also with adjacent rows of nozzles from adjacent nozzle boxes in the same set. The nozzle boxes are spaced from one another to provide clearance for the escape of tempering fluid after the latter is applied against the opposite major surfaces of the suspended glass sheet G.

Each of the nozzle boxes 16 and 18 is provided with an end plate at each longitudinal end thereof for supporting a stub shaft 24. The latter extend along the longitudinal axis of each nozzle away from each longitudinal end of each nozzle box 16 or 18. The stub shafts 24 are received in and supported at their ends by bearing housings 25 and 26. Each bearing housing 25 or 26 has a longitudinal horizontal bearing 27 to receive a free end of the associated stub shaft 24 and is also provided with an upper transverse aperture 28 extending front to rear and a lower transverse aperture 30 parallel to the upper aperture 28. Threaded shafts 32 extend horizontally through the upper and lower transverse apertures 28 and 30 and lock nuts 34 are provided to fix the position of each bearing housing 25 or 26 relative to the threaded shafts 32. The ends of the threaded shafts 32 are fixed in position relative to a pair of parallel flanges 35 of a vertically extending bearing housing support member 36 or 37 that is of channel-shaped configuration and rigidly mounted to one or the other structural supports 15 or 17. Each bearing housing support member includes a web member 38 that is transversely slotted at vertically spaced portions therealong.

Two bearing housing support members 36 are provided as part of structural support 15 to support the set of nozzle boxes 16. An additional two bearing housing support members 37 are provided as part of structural support 17 to support the set of nozzle boxes 18. The apparatus also includes a linkage support member 40 closely adjacent to one of the housing support members 36 and a linkage support member 41 adjacent its opposing housing support member 37. The construction and operation of the linkage support members 40 and 41 will be described later.

A pair of bearing housing support members 36 has pairs of bearing housings 25 and 26 adjustably positioned thereon to support the ends of the stub shafts 24 attached to the longitudinal ends of the first set of nozzle boxes 16, and a corresponding pair of bearing housing support members 37 has other pairs of bearing housings 25 and 26 adjustably positioned thereon to support the ends of the stub shafts 24 provided for the second set of nozzle boxes 18. The transversely slotted web member 38 of each housing support member 36 and 37 contains a plurality of slots, each of which receive the stub shafts 24 of the respective nozzle boxes 16 and 18.

A common drive motor M rotates a common spline shaft S which extends through a pair of gear boxes B to drive a pair of drive shafts D, one for each of a pair of eccentric drives 42. An adjustable link 43 connects one of the eccentric drives 42 to linkage support member 40, and another adjustable link 43 connects the other eccentric drive 42 to linkage support member 41. A pair of vertical guide bars 44 is rigidly supported by each structural support 15 and 17 to receive vertically apertured guide followers 46 fixed to each linkage support member 40 and 41 to guide and limit the movement of the latter to linear vertical reciprocations.

The longitudinally inward surface of each of the linkage support members 40 and 41 is provided with pairs of parallel bars that form horizontally transverse cam ways 48 aligned with each of the slots of the slotted web member 38. These transverse cam ways receive cam followers 50 in the form of freely rotating rollers. Each roller 50 is connected by a rod 51 to the inner end of a link 52. The outer end of each link 52 has a rounded apertured portion 53 whose diameter approximates that of the stub shaft 24 that it receives.

Each rounded portion 53 extends into a bifurcated end 54 of link 52. Each bifurcated end 54 has a transverse aperture through its upper bifurcation and an aligned threaded aperture in its lower bifurcation to receive a locking screw 55 so that the bifurcated outer end 54 clamps the rounded portion 53 about the periphery of each associated stub shaft 24.

A pair of transverse cams 48 is provided for each of the first set of nozzle boxes 16 and an additional pair of cams is provided for each of the second set of nozzle boxes 18. Therefore, when the eccentric drives 42 are actuated, the linkage support members 40 and 41 are constrained by the guide bars 44 and the guide bar followers 46 to reciprocate vertically, thus causing the links 52 to pivot as the cam followers 50 move horizontally along the cam ways 48 provided by the pair of transverse parallel bars. Such pivoting of the links 52 causes the stub shafts 24, which are rigidly connected to the bifurcated ends 54 of the links 52, to pivot in response to the longitudinally reciprocating cam follower movement. Such pivoting causes the nozzle boxes 16 and 18 to rotate in an oscillating manner about their longitudinal axes in response to the pivoting of the stub shafts 24 at the ends thereof.

It is obvious from the construction just described that each nozzle box 16 and 18 has a fixed vertical position and an adjustably fixed horizontal position and can be pivoted about its longitudinal axis by clamping its associated link 52 about its stub shaft 24 when the nozzle box is oriented properly and the link 43 of its eccentric drive is in its horizontal orientation. It also follows that the nozzles 21 extending from the apertured walls 20 of the nozzle boxes 16 and 18 are caused to follow arcuate paths so that tempering fluid blasts imparted therethrough cover the major surfaces of a glass sheet G suspended between the opposed sets of nozzle boxes 16 and 18 by sweeping thereacross.

Air under pressure is supplied to the nozzle boxes 16 and 18 through respective adapters 58 and 59, respective flexible couplings 60 and 61 and respective connecting pipes 62 and 63 to respective plenum chambers 64 and 66. The latter are rigidly supported on structural supports 15 and 17, respectively. Blowers (not shown) supply air under pressure through a flexible conduit 68 to each plenum chamber (only one of which is shown). A damper 70 may be provided between each flexible conduit 68 and each associated plenum chamber 64 and 66 to control the pressure of air supplied to the plenum chamber on either side of the position occupied by a glass sheet G during quenching independently of the pressure on the opposite side, as is customary in glass sheet tempering technology.

Each structural support 15 and 17 is attached to the inner end of a respective piston 80 and 81 for inward and outward movement along guide rails 82 and 83. In this manner, the space between the nozzle sets can be enlarged whenever it becomes necessary to obtain access to the apparatus for repair or maintenance or for any other reason.

The distance from the glass sheet G to the ends of the nozzle extensions 22 in the mid-point of the angular oscillation of the nozzle boxes 16 and 18 is determined by the individual transverse positions occupied by the bearing housings 25, 26. The angle of pivoting of the nozzle boxes relative to said mid-point is determined by the length of the adjustable links 43 and the eccentric drive 42 relative to the lengths of links 52. The orientation of the nozzle boxes at the mid-point of their angular oscillation is so adjusted that the nozzles 21 direct air blasts in a direction approximately normal to the localized surface of the glass sheet G that it faces. The angular oscillation on either side of the mid-point of the angular oscillation should not exceed 20 degrees and preferably is limited to a 15 degree sweep to either side of the mid-point of angular oscillation so as to insure optimum coverage and optimum cooling effect of the air blasts applied against the glass major surfaces. This method of limiting the angle of angular oscillation of the nozzles with respect to their mid-point of angular oscillation is the subject matter of a copending patent application Ser. No. 871,876 of Vaughn R. Imler, for METHOD OF IMPROVING QUENCH EFFICIENCY filed on the same date as the present application.

Figure 5:
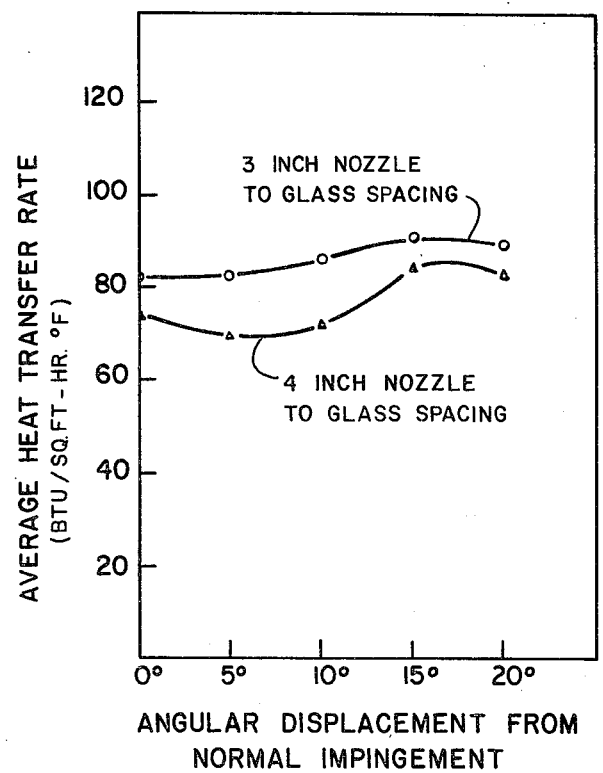
FIG. 5 is a diagram showing how the average heat transfer rate of air blasts from a nozzle array varies when the nozzle boxes are pivoted away from orientations where the nozzles direct blasts of tempering fluid normal to a glass sheet surface at different nozzle to glass spacings.

FIG. 5 shows how the total heat transfer rate per nozzle of air blasted through a nozzle array varies with the nozzle to surface orientation from normal to a 20 degree offset angle on a glass sheet surface for one-half inch (1.27 centimeters) diameter nozzles arranged in a two inch (5 centimeters) by two inch (5 centimeters) array. A higher heat transfer rate is shown for a nozzle to glass spacing of 3 inches (7.62 cm) and a lesser heat transfer rate is shown for a nozzle to glass spacing of 4 inches (10.16 cm) for a given pressure of 20 ounces per square inch (8000 pascals). The chart shows that the rate of heat transfer is substantially constant at an angular displacement of 0 to 20 degrees from normal impingement but is slightly higher than other orientations within this range when the angle of blast impingement deviates by 15 degrees from normal impingement.

The eccentric drives 42 for the opposite sets of nozzle boxes 16 and 18 are so arranged that when they are simultaneously operating, they are oriented approximately 90 degrees out of phase with respect to one another. This offset relationship has been found to reduce buffeting of the glass sheet suspended vertically by tongs. A copending application Ser. No. 871,888, of Vaughn R. Imler, for CONTROLLING BUFFETING DURING THE TEMPERING OF GLASS SHEETS, filed on the same date as this application, covers this technique for reducing buffeting of glass sheets undergoing quenching.

The nozzles 21 in the nozzle boxes 16 and 18 are arranged in a generally oblique criss-cross pattern wherein two horizontal rows of nozzles are provided for each nozzle box. The nozzles in each row are arranged 2 inches (5.08 centimeters) apart center to center along the length of the nozzle box. Each nozzle box is of square cross-section and 3 inches (7.62 centimeters) high and separated from its adjacent nozzle boxes by ½ inch (1.27 centimeters). Each row of nozzles is spaced approximately 1.75 inch (4.45 centimeters) in a vertical direction center to center from the adjacent horizontal rows of nozzles in either the particular nozzle box in question, or in the adjacent nozzle box. The nozzles have a circular cross-section of 0.625 inches (1.59 centimeters) outer diameter and an inner diameter of 0.527 inches (1.34 centimeters). The nozzle boxes are adjusted to have the free nozzle ends spaced 3 inches (7.62 centimeters) from the adjacent glass sheet surface at the mid-point of the angular oscillation of the nozzle boxes 16 and 18.

Less power is required to provide vertical movement of the relatively lightweight linkage support members 40 and 41, which causes a simultaneous rotary oscillation of each of the nozzle boxes 16 and 18 about its longitudinal axis which extends horizontally than would be required to either reciprocate or move orbitally the sets of nozzle boxes and their supporting structure as was done with prior art tempering apparatus. Furthermore, backlights having a nominal thickness of 5/32 inch (4 millimeters) that required air blasts at a nozzle pressure of 13 to 15 ounces per square inch (5600 to 6500 pascals) to produce an adequate temper when the apparatus was linearly reciprocated with the nozzle boxes moved in spaced flat planes, required air blasts at a nozzle pressure of only 10 to 12 ounces per square inch (4300 to 5200 pascals) to produce an adequate temper when the apparatus was modified according to the teachings of this invention to enable the individual nozzle boxes to pivot in unison without moving the entire nozzle box support structure.

The apparatus is prepared for use by adjusting the in-out position of each nozzle box so that its axis lies along a surface parallel to the curved surface of the glass sheet to be tempered. Each nozzle box of one set is fixed in orientation so that its nozzles extend in a direction approximately normal to the glass sheet surface portion it faces. The nozzle boxes of the first set are pivoted to their extreme pivoted position and the second set of nozzle boxes is fixed in orientation so that their nozzles extend approximately normal to the opposite glass surface portions. When a curved glass sheet is placed between the spaced sets of nozzle boxes so arranged to provide spaced arrays of nozzles facing the opposite major surfaces of the glass sheet, tempering fluid under pressure is applied to the nozzle boxes for discharge through the nozzles against the opposite major glass sheet surfaces while the nozzle boxes are pivoted about their fixed orientations in angular oscillations with the nozzle boxes on one side 90 degress out of phase with the nozzle boxes on the other side.

The form of the invention shown and described in this disclosure represents an illustrative preferred embodiment thereof. It is understood that various changes, such as orienting the nozzle boxes vertically rather than horizontally and reciprocating linkage support members oriented horizontally rather than vertically in the direction of their length so as to provide angular oscillation of the nozzle boxes about vertical axes rather than about horizontal axes that are parallel to the axis of glass bending, as well as other changes in dimensions and other modifications, such as the number of rows of nozzles per nozzle box, the spacing therebetween and other variations may be made without departing from the gist of the invention as defined in the claimed subject matter that follows.

I claim:
1. Apparatus for tempering glass sheets, comprising:
    a first set of longitudinally extending nozzle boxes arrayed side-by-side on one side of a glass sheet receiving space;
    a second set of longitudinally extending nozzle boxes arrayed side-by-side on the opposite side of the glass sheet receiving space;
    each of said nozzle boxes having a plurality of nozzles extending from one side thereof in the transverse direction toward the glass sheet receiving space, each of said nozzles communicating with the interior of the respective nozzle box which is, in turn, in communication with a source of pressurized tempering fluid so as to direct streams of tempering fluid through the nozzles toward the glass sheet receiving space;
    each nozzle box being pivotably connected to bearing means so as to permit each nozzle box to pivot about a longitudinally extending axis;
    each bearing means being supported on end frame means with means to adjust the location of each bearing means in the transverse direction relative to said frame means so as to permit independent adjustment of the spacing between each nozzle box and the surface of a glass sheet within the glass sheet receiving space;
    lever arm means extending generally in the transverse direction associated with each nozzle box, one end of each lever arm being provided with clamp means for adjustably affixing the angular relationship between the respective nozzle box and its associated lever arm, the opposite end of each lever arm being connected to means for oscillating the lever arms so as to oscillate each of the nozzle boxes about its said longitudinal pivot axis.

2. Apparatus as in claim 1, for use in tempering glass sheets bent about a substantially horizontal axis, wherein said nozzle boxes are supported in vertically spaced relation in each set with each nozzle box extending along a generally horizontal axis.

3. Apparatus as in claim 1, for use in tempering glass sheets bent about a substantially vertical axis, wherein said nozzle boxes are supported in horizontally spaced relation in each set with each nozzle box extending along a generally vertical axis.

4. Apparatus as in claim 1, wherein the nozzle boxes are provided with said nozzles arranged in rows extending parallel to the longitudinal axis of said nozzle box, the space between adjacent nozzles in each row is uniform and the space between adjacent nozzle rows is equal.

5. Apparatus as in claim 4, wherein each nozzle box is provided with a pair of rows of nozzles and said nozzle boxes are spaced from one another in such a manner that the distance between adjacent rows of nozzles is approximately equal.

* * * * *